No. 848,751. PATENTED APR. 2, 1907.
I. KITSEE.
ELECTRIC TRANSMISSION OF INTELLIGENCE.
APPLICATION FILED AUG. 9, 1906.
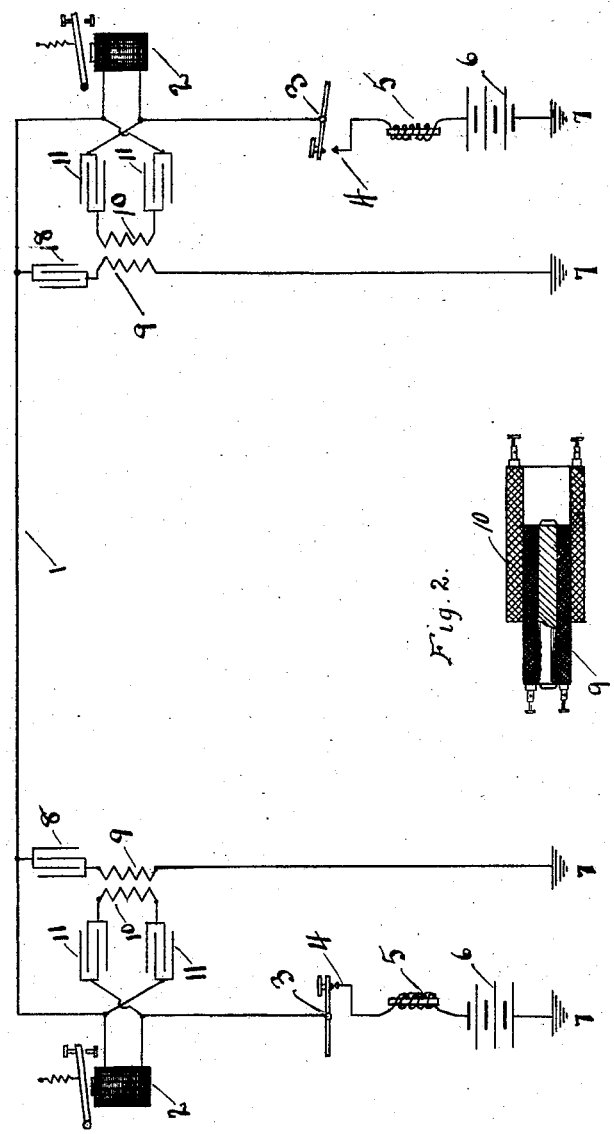

UNITED STATES PATENT OFFICE.

ISIDOR KITSEE, OF PHILADELPHIA, PENNSYLVANIA.

ELECTRIC TRANSMISSION OF INTELLIGENCE.

No. 848,751.  Specification of Letters Patent.  Patented April 2, 1907.

Application filed August 9, 1906. Serial No. 329,886.

*To all whom it may concern:*

Be it known that I, ISIDOR KITSEE, a citizen of the United States, residing at Philadelphia, in the county of Philadelphia and State of Pennsylvania, have invented certain new and useful Improvements in Electric Transmission of Intelligence, of which the following is a specification.

My invention relates to an improvement in electric transmission of intelligence.

It has reference to lines in the region of inductive influence from other lines.

In the drawings, Figure 1 represents in diagrammatic view a line of transmission, two stations therefor, each embodying my invention. Fig. 2 is a section of the adjustable converter.

1 is the line of transmission.

A and B are the two stations, each equipped with the sources of current 6, impedance 5, transmitting-key 3 and 4, and the receiving device 2.

So far the arrangement is the usual one as employed on land-lines; but at each station a second path to the ground is established, and this path is provided with the condenser 8 and the coil 9 of a converter. The second coil (coil 10 of this converter) is, with the interposition of the condensers 11, connected to the receiving device 2.

It is well known that condensers are an effectual bar to the flow of a straight or voltaic current, and it is equally well known that impedances have a retarding influence on the flow of induced currents. When, therefore, the operator manipulates his key and sends impulses over the line, these impluses will not flow over the branch containing the condenser 8 and coil 9. They will flow over the line and at the other station through the receiving device 2 and then to the ground. If impulses are induced in the line from neighboring lines, these impulses will flow to the greatest extent through these branches to the ground. They will induce impulses in the coil 9, whereby impulses will be induced in the coil 10, and these impulses will neutralize any of the induced impulses that may flow through that part of the line embracing the receiver 2.

It is necessary that the operator shall be able to vary the relation of coil 10 to coil 9 so as to exactly counterbalance the effect of any of the impulses flowing directly from the line through the path containing the receiving device 2, and in Fig. 2 I have illustrated one method of varying the relation of these two coils to each other. This method consists simply therein that the coil 9 is partially withdrawn from the recess of coil 10.

Having now described my invention, what I claim as new, and desire to secure by Letters Patent, is—

1. A line of transmission comprising means to neutralize the inducing effect of other lines, said means embracing for the devices inserted in said line a converter, one coil connected to part of the circuit with the interposition of condensers and the second coil connected in multiple arc to the receiving device to be protected.

2. In combination with a line of transmission and stations therefor, means to protect the receiving devices of said stations from the influence of impulses induced in said line, said means comprising a path opaque to the flow of a voltaic current, said path connected with one terminal to the line and with the second terminal to the ground, one coil of a converter inserted in said path and the second coil of said converter connected with the interposition of condensers to the device to be protected.

3. As a means to protect devices inserted in a line of transmission from the inducing effect on neighboring lines, a converter for each of said devices, one coil connected in a grounded branch circuit and the second coil connected in multiple arc to the device to be protected, both coils provided with means to make the same opaque to the flow of a voltaic or straight current.

In testimony whereof I affix my signature in presence of two witnesses.

ISIDOR KITSEE.

Witnesses:
MARY C. SMITH,
ALVAH RITTENHOUSE.